Aug. 30, 1949.    E. B. DERR    2,480,227
STERILIZING AND DRYING CABINET USING HOT AIR
Filed Aug. 29, 1945    2 Sheets-Sheet 1

Inventor:
Elmer B. Derr
By: Paul O. Pippel
Atty.

Aug. 30, 1949.  E. B. DERR  2,480,227
STERILIZING AND DRYING CABINET USING HOT AIR
Filed Aug. 29, 1945  2 Sheets-Sheet 2
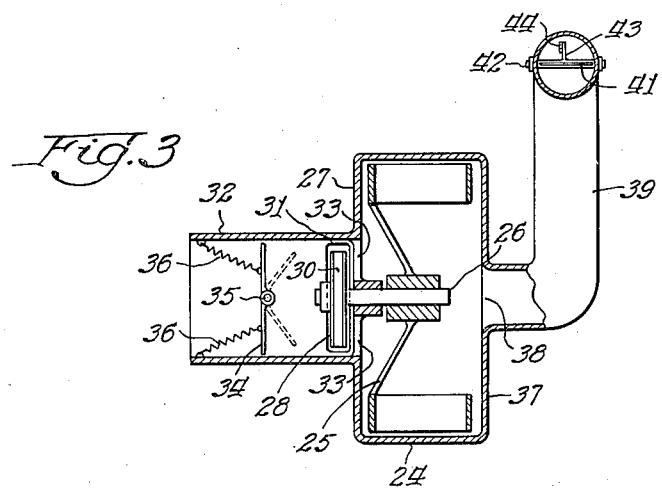
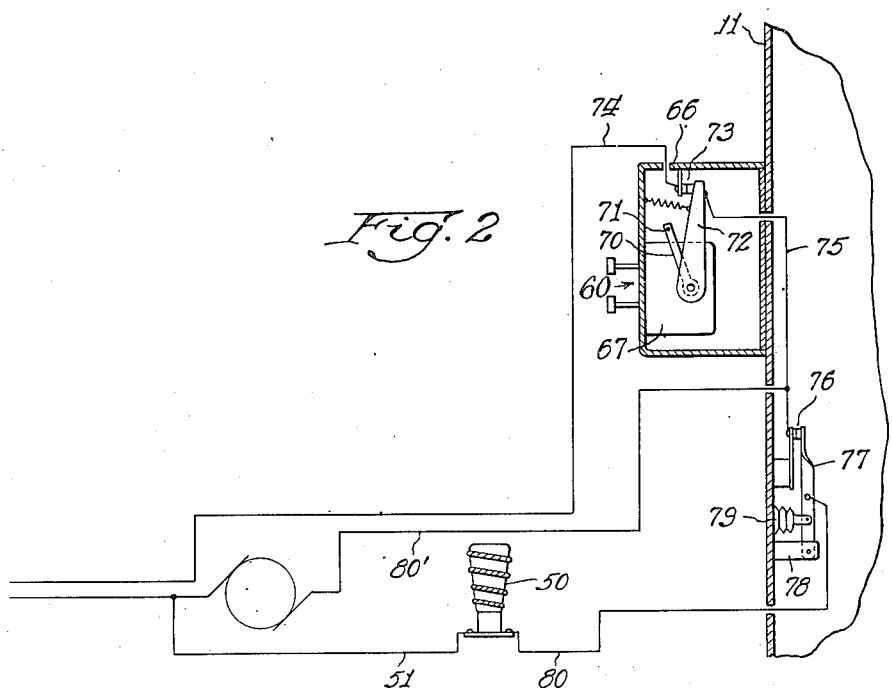
Inventor:
Elmer B. Derr Patented Aug. 30, 1949

2,480,227

UNITED STATES PATENT OFFICE 2,480,227

STERILIZING AND DRYING CABINET USING HOT AIR

Elmer B. Derr, Oak Park, Ill., assignor to International Harvester Company, a corporation of New Jersey Application August 29, 1945, Serial No. 613,234

7 Claims. (Cl. 34—45)

This invention relates to a sterilizing and drying cabinet using hot air particularly adapted for sterilizing milking equipment. Since the advent of milking machines, which are now used in a great proportion of the commercial dairies, a major problem has been to sterilize the equipment between milkings and to maintain the equipment in such condition that the bacteria count of the milk handled meets with the requirements of city ordinances and other regulations. This is not a particularly easy problem and it has been found that without extreme care the bacteria count of machine milking may be higher than hand milking. There has, therefore, been a demand which has not been fully met for equipment especially designed to sterilize and to maintain in a sterile condition the different parts of milking equipment which contact the milk.

The principal object of the present invention is to provide an improved sterilizing device having automatic controls which assure a sterilizing temperature being reached in a minimum of time, and which prevents the development of excessive temperatures which are apt to damage certain parts of the milking equipment such as rubber hoses.

Another principal object is to provide a sterilizing device which at the same time dries the equipment by providing circulating heated air after a sterilizing temperature has been reached.

Other objects, such as the provision of adequate cooperating controls, will be apparent from the detailed description to follow.

In the drawings,

Figure 2 is an enlarged section of one side of the cabinet illustrating some of the controls and the circuit for the controls; and Figure 3 is a section taken substantially on the line 3—3 of Figure 1.

Figure 1:
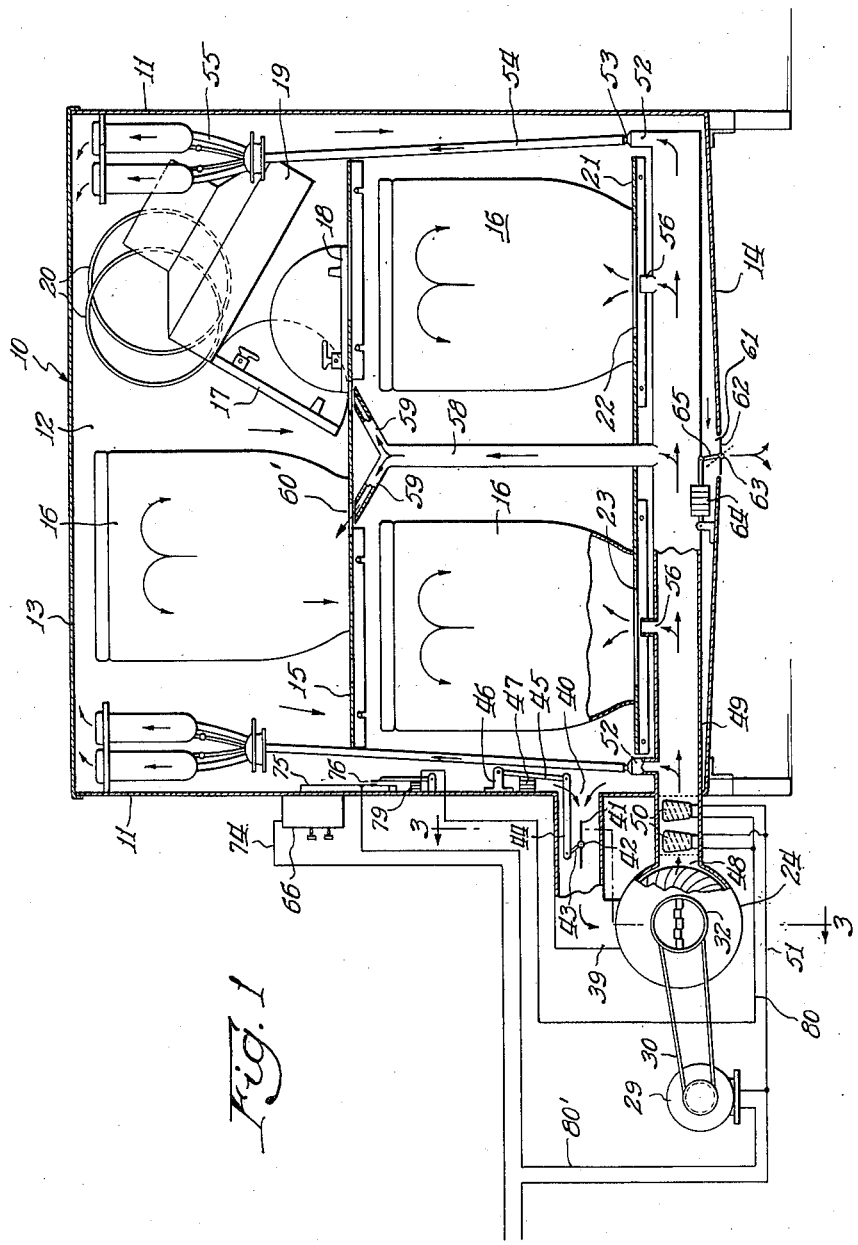
Figure 1 is a vertical cross-sectional view, somewhat diagrammatic in parts, showing a sterilizing cabinet incorporating the invention with the milking equipment positioned therein.

In the drawings a cabinet 10 is illustrated, said cabinet having side walls 11, end walls 12, one of which only is shown because of the sectional view, a top wall 13 and a bottom wall 14. The cabinet may be side opening or top opening depending on its location and the means of mounting the shelves therein. A horizontal upper shelf provides for supporting milker equipment, such as a milker pail 16, milker pail covers 17 and 18, a strainer structure 19, and rubber pail gaskets 20. A lower horizontal shelf 21 is shown as supporting additional milker pails 16. Said lower shelf is provided with openings 22 and 23 for access of heated air into the pails, as will be hereinafter described. It is to be understood that any type of openings, such as a grid or screen, could be suitably used for the shelf 21 and also the shelf 15. The shelves may be removable as indicated in the upper shelf 15, if desired.

A fan or blower housing 24 contains a fan or blower 25 mounted on a shaft 26. Said shaft projects through an end wall 27 of the housing, being rotatably supported thereby. A drive pulley 28 on the shaft 26 provides for driving the fan by an electric motor 29 through a belt 30. An opening 31 is provided in a cylindrical extension 32 on the housing 27 for passage of the belt 30. Openings 33 in the end wall 27 of the fan housing provide for the entrance of air from the cylindrical extension 32 into the fan housing. A pair of semicircular dampers 34 are pivoted on a hinge pin 35 positioned diametrically in the cylindrical extension 32. A pair of springs 36 normally hold said dampers in closed position whereby only a small amount of air is drawn into the fan housing through the opening 33.

The other end wall 37 of the fan housing is provided with a central opening 38 to which a conduit 39 is connected. Said conduit connects with the cabinet 10 at an opening 40. An airflow control device is provided to regulate the flow of air through the conduit 39. A damper 41 pivoted on a shaft 42 is provided with an actuating arm 43 to which a link 44 is pivotally connected. Said link extends through the conduit 39 to a point within the cabinet 10, being pivotally connected therein to a link 45. Said link is in turn pivotally connected to a bracket 46 secured to the adjacent wall 11 of the cabinet. A conventional bellows type of thermo-responsive device 47 is positioned to operate between the wall 11 and the link or lever 45 so that upon an increased temperature in the cabinet 10 the bellows 47 expands, thereby closing the damper 41 and reducing or stopping the flow of air through the conduit 39.

The fan housing 24 is provided at one side of its peripheral wall with an outlet 48 which provides a connection point for a conduit 49. A pair of heating elements 50 are arranged in the conduit 49 adjacent the outlet opening 48 from the fan housing. Said heating elements are arranged in parallel relation on an electrical line 51. A time switch controls both the fan motor 29 and the heater coils 50 in such a manner that the fan motor 29 will operate continuously during sterilizing cycle controlled only by a timing device 60. The heater elements 50 are controlled both by the timing device 60 and by a thermostat 79 which is wired in series with the time switch.

The conduit 49 extends entirely across the bottom of the cabinet, being provided with a plurality of outlets for directing heated air to specific locations in the cabinet. Heated air outlets 52 are provided with reduced nipples 53 at their ends over which the milk hoses 54 of teat cup inflation clusters 55 may be fitted. The heated air is then passed through the tubes and through the milk-wetted portions of the teat cup assemblies, thereby drying the surfaces and completely sterilizing them with hot air of the required temperature. Outlet openings or nozzles 56 from the conduit 49 are positioned to discharge through the openings 22 and 23 in the shelf 21 directly into the two inverted milk pails 16 mounted on said shelf. The blast of hot sterilizing air sweeps through the interior of the milk pails drying and sterilizing the surfaces thereof, the interior surfaces being those which contact the milk and which must necessarily be sterilized to reduce bacteria count in the milk.

An upwardly extending conduit 58 connecting with the conduit 49 has branches 59 at its upper end, one branch communicating with an opening 50' in the upper shelf 15 for directing heated air interiorly of a milk pail 16 on the upper shelf, the other branch being directed to deliver heated air for sterilizing the miscellaneous equipment shown including milk-pail covers 17 and 18 and other parts.

The bottom 14 of the cabinet slants centrally to an opening 61 in which a damper 62 is pivotally mounted on a shaft 63. Said damper is normally in the closed position indicated. When the temperature of the air in the cabinet reaches and exceeds the required sterilizing temperature, an expansible bellows device or Sylphon 64 connected to a lever arm 65 on the damper 62 operates to open the damper to the indicated dotted-line position.

In order to further control the temperature of the air within the sterilizing cabinet 10 and to time the operation of the air within the sterilizing cabinet 10 and to time the operation of the device so as to obtain the necessary temperature for the necessary length of time, an additional control device is provided. A timing device is diagrammatically indicated including a case 66 having a timing device in the form of a clock 67 mounted therein, a winding knob and a setting knob being provided for controlling the operation of the clock. An operating arm 70 extending from the clock and moved at a timed rate by the clock is provided with a pin 71 positioned to engage a breaker arm 72, thereby separating contact points 73 and breaking a circuit including an electrical conductor 74 and an electrical conductor 75. The conductor 75 connects with contact points 76, one of which is mounted on a control arm 77 pivoted to a bracket 78 on a wall 11 of the cabinet. The thermoexpansible element 79 acts between said wall and the arm 77 to separate the contacts 76 when the temperature in the cabinet reaches a certain predetermined degree. An electrical conductor 80 leads from the arm 77 to the circuit including the heating elements. An electrical conductor 80' leads from the motor to the conductor 75 between the thermostat arms 77 and the electrical contact 73.

In the operation of the device above described the following equipment to be sterilized is positioned in the cabinet as indicated, the clock is set for the desired time of operation and contact is made in the main circuit. The fan 25 draws air from the cabinet through the conduit 39 forcing it over the heater elements 50 into the conduit 49 from which it is distributed as previously set forth. When the air has reached sterilizing temperature throughout the cabinet, the damper 62 begins to open, the damper 41 begins to close, being actuated by their respective thermosensitive control elements, and the dampers 34 start to open to admit fresh air from outside. The air then delivered by the heating elements is drier and therefore more effective in drying out the milking equipment, a condition which is most conducive to rapid sterilization. This condition may continue depending upon the amount of heat required and utilized or the said dampers may open or close depending upon changes in the air temperature.

If the overall temperature in the cabinet reaches a degree sufficient to actuate the thermosensitive element 79, the contacts 76 are broken, thereby stopping supply of heat by the heating elements 50 while the motor continues to operate. Regardless of whether this cut-off takes place, the timing device operates when the selected time interval has passed, breaking the contact points 73 and rendering the entire device inoperative. This timing device and the other controls are so adjusted that sterilization is automatically assured.

Applicant has shown and described a preferred embodiment of his improvement in sterilizing devices particularly adapted for milking equipment. All of the controls illustrated and described may not be necessary in every installation and it is to be further understood that it is applicant's intention to limit his invention only by the scope of the appended claims.

What is claimed is:

1. A sterilizing device for milking equipment comprising, a cabinet, means for supporting a milker pail in an inverted position in said cabinet, a fan housing, a fan in said housing, an opening in said housing communicating with the atmosphere, damper means connected to the housing for closing said opening, said damper means being constructed and arranged to open the opening for the inlet of air during a pressure differential in the housing with respect to atmospheric pressure, a recirculating conduit connected with said fan housing and with said cabinet, a thermostatically controlled damper located in said conduit, a motor controlling device including a timing mechanism, a conduit connecting said fan housing with the cabinet, and heating means arranged in said conduit, said heating means being electrically operated and being in parallel with the motor circuit, said conduit within the casing being provided with a discharge conduit positioned below the open end of the milker pail whereby heated air is delivered directly to the interior of said pail and circulated therein.

2. A sterilizing device for milking equipment comprising, a cabinet, means for supporting a milker pail in an inverted position in said cabinet, a fan housing having an opening, a fan in said housing communicating with the atmosphere, a damper connected to the fan housing, said damper including a spring, said spring being biased to normally maintain said damper in a closed position with respect to said opening, said damper being constructed and arranged to open said opening for the inlet of air upon a given pressure differential in the housing with respect to atmosphere pressure, a recirculating conduit connected with said fan housing and with said cabinet, a thermostatically controlled damper located in said conduit, an opening in said cabinet communicating with the atmosphere, a thermostatically controlled damper in said opening, a motor controlling device including an electrictl timing mechanism, a conduit connecting said fan housing with the cabinet, and heating means arranged in said conduit, said heating means being electrically operated and being in parallel with the motor circuit, said conduit within the casing being provided with a discharge conduit positioned below the open end of the milker pail whereby heated air is delivered directly to the interior of said pail and circulated therein.

3. A sterilizing device for milking equipment comprising, a cabinet, means for supporting teat cups having a common milk delivery hose in said casing, a fan housing, a fan in said housing, an electric motor for operating said fan, an opening in said housing communicating with the atmosphere, a recirculating conduit connected with said fan housing and with said cabinet, a thermostatically controlled damper located in said conduit, an opening in said cabinet communicating with the atmosphere, a thermostatically controlled damper in said opening, a motor controlling device including a timing mechanism, a conduit connecting said fan housing with the cabinet, heating means arranged in said conduit, said heating means being electrically operated and being in parallel with the motor circuit, said conduit within the casing being provided with conduit means formed with a distributor adapted to be connected directly to the hose of the teat cups whereby heated air is delivered directly therethrough.

4. A sterilizing device for milking equipment comprising, a cabinet, means for supporting milker pails in an inverted position in said cabinet, means for supporting teat cups having a common milk delivery tube in said casing, a fan housing, a fan in said housing, an electric motor for operating said fan, an opening in said housing communicating with the atmosphere, a recirculating conduit connected with said fan housing and with said cabinet, a thermostatically controlled damper located in said conduit, an opening in said cabinet communicating with the atmosphere, a thermostatically controlled damper in said opening, a motor controlling device including a timing mechanism, a conduit connecting said fan housing with the cabinet, heating means arranged in said conduit, said heating means being electrically operated and being in parallel with the motor circuit, said conduit within the casing being provided with discharge conduits positioned below the open end of the milker pails whereby heated air is delivered directly to the interior of said pails and circulated therein, and additional conduit means provided with a distributor adapted to be connected directly to the hose of the teat cup whereby heated air is delivered directly therethrough.

5. A sterilizing device for milking equipment comprising, a cabinet, means for supporting milker pails in an inverted position in said cabinet, means for supporting teat cups having a common milk delivery tube in said casing, a fan housing, a fan in said housing, an electric motor for operating said fan, an opening in said housing communicating with the atmosphere, spring loaded damper means mounted to close said opening and adapted to be opened for the inlet of air with a given pressure differential in the housing with respect to atmospheric pressure, a recirculating conduit connected with said fan housing and with said cabinet, a thermostatically controlled damper located in said conduit, an opening in said cabinet communicating with the atmosphere, a thermostatically controlled damper in said opening, a motor controlling device including a timing mechanism, a conduit connecting said fan housing with the cabinet, heating means arranged in said conduit, said heating means being electrically operated and being in parallel with the motor circuit, said conduit within the casing being provided with discharge conduits positioned below the open end of the milker pails whereby heated air is delivered directly to the interior of said pails and circulated therein, and additional conduit means provided with a distributor adapted to be connected directly to the hose of the teat cup whereby heated air is delivered directly therethrough.

6. A sterilizing device for milking equipment comprising, a cabinet, means for supporting milker pails in an inverted position in said cabinet, means for supporting teat cups having a common milk delivery tube in said casing, a fan housing, a fan in said housing, an electric motor for operating said fan, an opening in said housing communicating with the atmosphere, spring loaded damper means mounted to close said opening and adapted to be opened for the inlet of air with a given pressure differential in the housing with respect to atmospheric pressure, a recirculating conduit connected with said fan housing and with said cabinet, a thermostatically controlled damper located in said conduit, an opening in said cabinet communicating with the atmosphere, a thermostatically controlled damper in said opening, a motor controlling device including a timer mechanism, a conduit connecting said fan housing with the cabinet, heating means arranged in said conduit, said heating means being electrically operated and being in parallel with the motor circuit, said conduit within the casing being provided with discharge conduits positioned below the open end of the milker pails whereby heated air is delivered directly to the interior of said pails and circulated therein, and additional conduit means provided with a distributor adapted to be connected directly to the hose of the teat cup whereby heated air delivered directly therethrough.

7. A sterilizing device for milking equipment comprising a cabinet, means for supporting a plurality of items of milking equipment within said cabinet, a fan housing having an opening, a fan in said housing arranged to communicate with the atmosphere, a first damper for normally closing the opening in said fan housing, a recirculating conduit connected with said fan housing and with said cabinet, a second damper located in said conduit, thermostatic means connected to said damper for moving the same to open and close said conduit in response to temperature changes within the cabinet, said cabinet having an atmosphere opening, a third damper for said opening, said third damper including thermostatic means arranged to open and close said damper in response to temperature changes within said cabinet, a conduit connecting said fan housing and said cabinet, heating means arranged in said conduit, said conduit being provided with discharge conduits for directing heated air directly to items within said cabinet thereby sterilizing the items, a motor for driving said fan, and electrical means for actuating said heating means, said third damper being arranged and constructed to open said cabinet to the atmosphere at a given temperature whereby said second damper is closed in said recirculating conduit and said first damper is opened in response to the pressure differential in the housing with respect to the atmosphere whereby the fan circulates the incoming atmosphere over said heating means and to said discharge conduits.

ELMER B. DERR.

REFERENCES CITED

The following references are of record in the file of this patent:

UNITED STATES PATENTS

| Number | Name | Date |
| --- | --- | --- |
| 1,004,074 | Powers | Sept. 29, 1911 |
| 1,431,145 | Bolling | Oct. 10, 1922 |
| 1,523,509 | Braemer | Jan. 20, 1925 |
| 1,655,538 | Ford et al. | Jan. 10, 1928 |
| 1,786,191 | Carroll | Dec. 23, 1930 |
| 1,886,286 | Martin | Nov. 1, 1932 |
| 1,887,581 | Cowan | Nov. 15, 1932 |
| 2,079,157 | De Lin | May 4, 1937 |
| 2,127,932 | Pellkofer | Aug. 23, 1938 |
| 2,184,473 | Scanlan | Dec. 26, 1939 |
| 2,188,528 | Clark | Jan. 30, 1940 |
| 2,236,711 | Kilbury | Apr. 1, 1941 |
| 2,284,674 | Murdock | June 2, 1942 |
| 2,308,332 | Irwon et al. | Jan. 12, 1943 |
| 2,406,494 | Ferris | Aug. 27, 1946 |